US012275129B1

(12) United States Patent
Zhang et al.

(10) Patent No.: US 12,275,129 B1
(45) Date of Patent: Apr. 15, 2025

(54) TOOLBOX GROUP CONNECTING STRUCTURE

(71) Applicant: Zhangjiagang SMK MFG. Co., Ltd., Zhangjiagang (CN)

(72) Inventors: Jinhui Zhang, Zhangjiagang (CN); Li Huang, Zhangjiagang (CN)

( * ) Notice: Subject to any disclaimer, the term of this patent is extended or adjusted under 35 U.S.C. 154(b) by 0 days.

(21) Appl. No.: 18/391,807

(22) Filed: Dec. 21, 2023

(30) Foreign Application Priority Data

Nov. 24, 2023 (CN) ......................... 202311581467.5

(51) Int. Cl.
*B25H 3/02* (2006.01)
*B65D 21/02* (2006.01)

(52) U.S. Cl.
CPC ......... *B25H 3/021* (2013.01); *B65D 21/0209* (2013.01)

(58) Field of Classification Search
CPC .. B25H 3/021; B65D 21/0209; A47B 87/008; A47B 87/00; A47B 87/02
USPC .......................... 206/349; 312/198, 107, 111
See application file for complete search history.

(56) References Cited

U.S. PATENT DOCUMENTS 3,995,923 A * 12/1976 Shell ..................... F16B 5/0092 248/188.4
4,468,067 A * 8/1984 Jenkins ................... F16B 12/32 403/252

* cited by examiner

*Primary Examiner* — J. Gregory Pickett
*Assistant Examiner* — Sanjidul Islam

(57) ABSTRACT

A toolbox group connecting structure includes a connecting device and a snap-fitting device. The connecting device and the snap-fitting device are respectively installed on two adjacent toolboxes, and the two adjacent toolboxes are inserted to mate through the connecting device and the snap-fitting device, a plurality of toolboxes together form a trolley tool cart. By combining the plurality of toolboxes into the trolley tool cart that can be easily moved, the connection between the toolboxes constitutes an independent connection, thus making classification clear and not affecting each other. Therefore, it is possible to take and put down one toolbox in any position directly, and it is only necessary to separate two toolboxes connected to the toolbox. Meanwhile, the toolbox has a weight no effect on a process of taking, so that taking the toolbox is more efficient and quicker.

5 Claims, 7 Drawing Sheets

TOOLBOX GROUP CONNECTING STRUCTURE

TECHNICAL FIELD

The present disclosure relates to the technical field of toolbox applications, and in particular relates to a toolbox group connecting structure.

BACKGROUND

A toolbox is a container, especial is the container for storing tools, for different types of tools, it is classified into different toolboxes according to specific tool sizes, uses, etc., In a home, the toolboxes are usually stacked in a storage room to reduce an occupied area. When it is necessary to move various tools to a work location, toolboxes included these tools are often placed in a large tool cart for carrying. When these toolboxes are placed in a tool trolley for transportation, multiple toolboxes are stacked irregularly in a large tool trolley, its classification is not clear enough. And then when some objects in the toolboxes are taken again, it is need to search for a corresponding toolbox, which is inefficient, and the multiple toolboxes stacked in the tool trolley are not easy to move.

Therefore, the present disclosure provides a novelty toolbox group connecting structure, which can connect a plurality of toolboxes as a whole through the toolbox group connecting structure, and by means of mobile wheels on the toolboxes themselves to form them into a trolley tool cart easily to move, thereby solving above technical problems.

SUMMARY

The present disclosure aims to provide a novelty toolbox group connecting structure to address above mentioned problems.

To realize above objectives, the present disclosure adopts following technical solutions. In some embodiments of the present disclosure, a toolbox group connecting structure is provided, which includes a connecting device and a snap-fitting device, the connecting device is mated to connect the snap-fitting device to constitute a connecting mechanism. Herein the connecting device and the snap-fitting device are respectively installed on two adjacent toolboxes, and the two adjacent toolboxes are inserted to mate through the connecting device and the snap-fitting device, and a plurality of toolboxes together form a trolley tool cart. The connecting device includes a connecting plate, the connecting plate is fixedly connected with a connecting box at an upper side, the connecting box is configured with an internal cavity inside, and the internal cavity is configured with a press switch for sliding connection. Left and right sides of the press switch each is configured with a placing slot, the placing slot at a lower end is configured to run through a bottom wall of the press switch, the placing slot is closed at an upper end, and the placing slot has a press spring placed therein. An upper end of the press spring rests against the upper end of the placing slot, a lower end of the press spring rests against a bottom wall of the internal cavity, and the internal cavity is configured with a guiding slot corresponding to a position of the press spring. An inner center of a side wall of the press switch that away from the snap-fitting device is fixedly connected to an install post, the install post is configured to sleeve with a stop spring, and one end of the stop spring that far away from the install post is fixed connected with a stop plate. A side wall of the press switch near the snap-fitting device is configured with a penetration opening corresponding to a position of the stop plate, and the stop plate slides through the penetration opening. The left and right sides of the press switch are further symmetrically configured with a through opening, and the through opening is fixedly connected with a bump at a lower side near an end of the snap-fitting device. A side wall of the connecting box near the snap-fitting device that corresponding to the through opening at the left and right sides is configured with snap sockets for snap blocks to pass through, and a position corresponding to the stop plate is configured with a notch for the stop plate to pass through.

In some preferred embodiments of the present disclosure, an outside of the bump facing the press switch is configured with a connecting bevel.

In some preferred embodiments of the present disclosure, the stop plate is also fixedly connected to a limiting bump at one end near the install post.

In some preferred embodiments of the present disclosure, the internal cavity is configured with a stepped opening at an upper end, a connecting cover is movably embedded into the stepped opening, four corners of the connecting cover are fixedly embedded in the connecting box by means of a number of connecting bolts, an exploratory outlet is provided in a center of the connecting cover, and a boss is provided at the upper end of the press switch and the boss extends upwardly through the exploratory outlet.

In some preferred embodiments of the present disclosure, the snap-fitting device includes a snap plate, the snap plate is configured with a docking bayonet corresponding to a position of the connecting box, the docking bayonet inside corresponding to positions of two through openings of the connecting box are fixedly connected to the snap blocks, a center of each snap block is opened with a snap interface for mating and snapped with the bump, and a backstop slot is provided between two snap blocks corresponding to a position of the stop plate for the stop plate to be pushed in.

The present disclosure has at least following beneficial effects and technical advantages compared to existing technologies.

1. The toolbox group connecting structure of the present disclosure, by combining the plurality of toolboxes into the trolley tool cart that can be easily moved, the connection between the toolboxes constitutes an independent connection, thus making classification clear and not affecting each other. Therefore, it is possible to take and put down one toolbox in any position directly, and it is only necessary to separate two toolboxes connected to the toolbox. Meanwhile, the toolbox has a weight no effect on a process of taking, so that taking the toolbox is more efficient and quicker.
2. The connecting mechanism adopted in the present disclosure can realize an integral separation of a plurality of toolboxes by means of one press to detach without additional operation, and also can realize an automatic reset of locking by using elastic force of the spring, thereby improving the simplicity of the separation and connection operation of the plurality of toolboxes.
3. By designing structures of the stop spring, the backstop slot and the stop plate, it is possible to make the stop plate be controlled to abut into the backstop slot under the action of the stop spring when the press switch is pressed down, so as to make the press switch lock the position. Moreover, the connection and separation of the snap block and the bump can achieve quick separation of the connecting device and the snap-fitting device.

By designing structures of the press spring, the bump, the snap block, the stop spring, the backstop slot and the stop plate, it is possible that when two toolboxes are docked, the snap block is first contacted against the bump, and under an influence of the connecting bevel of the bump, the bump drives the press switch to press downwardly, and the press switch presses downwardly to drive the stop spring to retract the stop plate. After the docking bayonets of the bump and the snap block are aligned, the press spring lifts up the press switch so that the bump snaps into the docking bayonet of the snap block. Then the two toolboxes are tightly connected, the stop plate is not seated on the stop plate due to the press switch being moved upward more, and the press switch is free to move around.

BRIEF DESCRIPTION OF THE DRAWINGS

The present disclosure is further described below in conjunction with accompanying drawings and embodiments.

Figure 1:
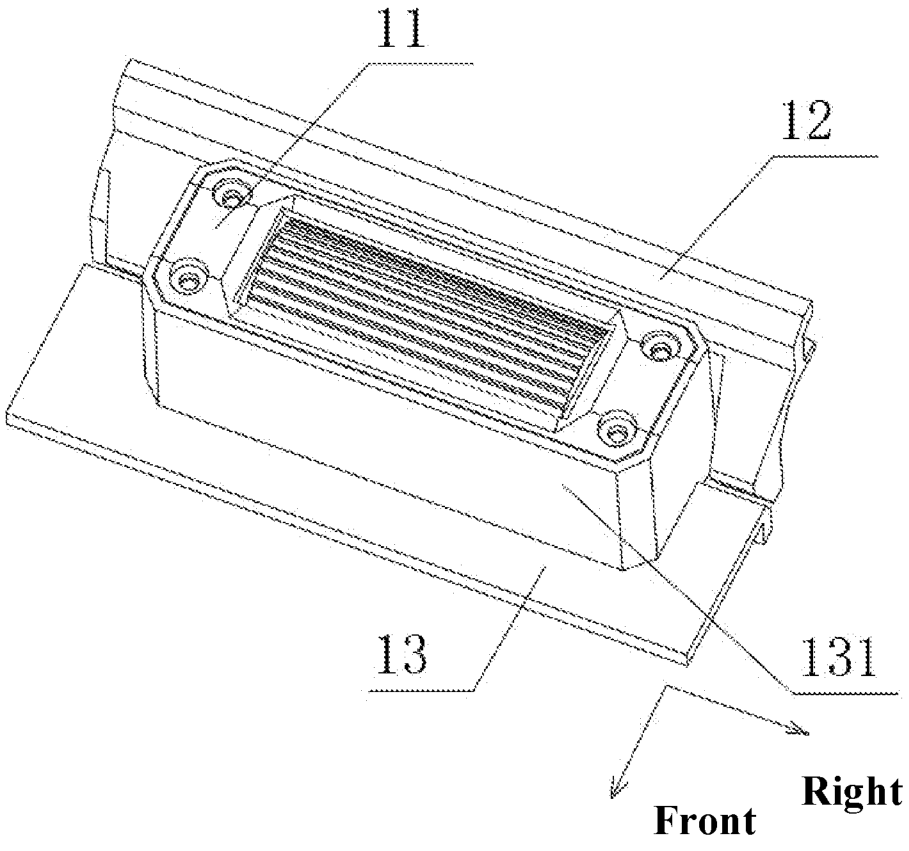
FIG. 1 is a structural schematic diagram illustrating a first view stereoscopic of a toolbox group connecting structure in accordance with some embodiments of the present disclosure.

In the drawings, reference signs are as follows. 1. connecting mechanism, 11. connecting cover, 12. snap-fitting device, 121. snap block, 122. snap interface, 123. backstop slot, 124. snap plate, 13. connecting device, 131. connecting box, 1211. snap socket, 1312. notch, 1313. guiding slot, 1314. internal cavity, 132. connecting plate, 14. press switch, 141. press spring, 142. Bump, 143. stop spring, 144. stop plate, 145. placing slot, 146. penetration opening, 147. install post, 2. toolbox.

DETAILED DESCRIPTION OF THE EMBODIMENTS

Embodiments of the present disclosure are described in detail below in conjunction with the accompanying drawings, and the present disclosure may be implemented in a number of different ways as defined and covered by appended claims.

Referring to FIG. 1 to FIG. 7, in some embodiments of the present disclosure, a toolbox group connecting structure is provided, which includes a connecting device 13 and a snap-fitting device 12. Herein the connecting device 13 and the snap-fitting device 12 are respectively installed on two adjacent toolboxes 2, and the two adjacent toolboxes 2 are inserted to mate through the connecting device 13 and the snap-fitting device 12, and a plurality of toolboxes 2 together form a trolley tool cart.

Figure 2:
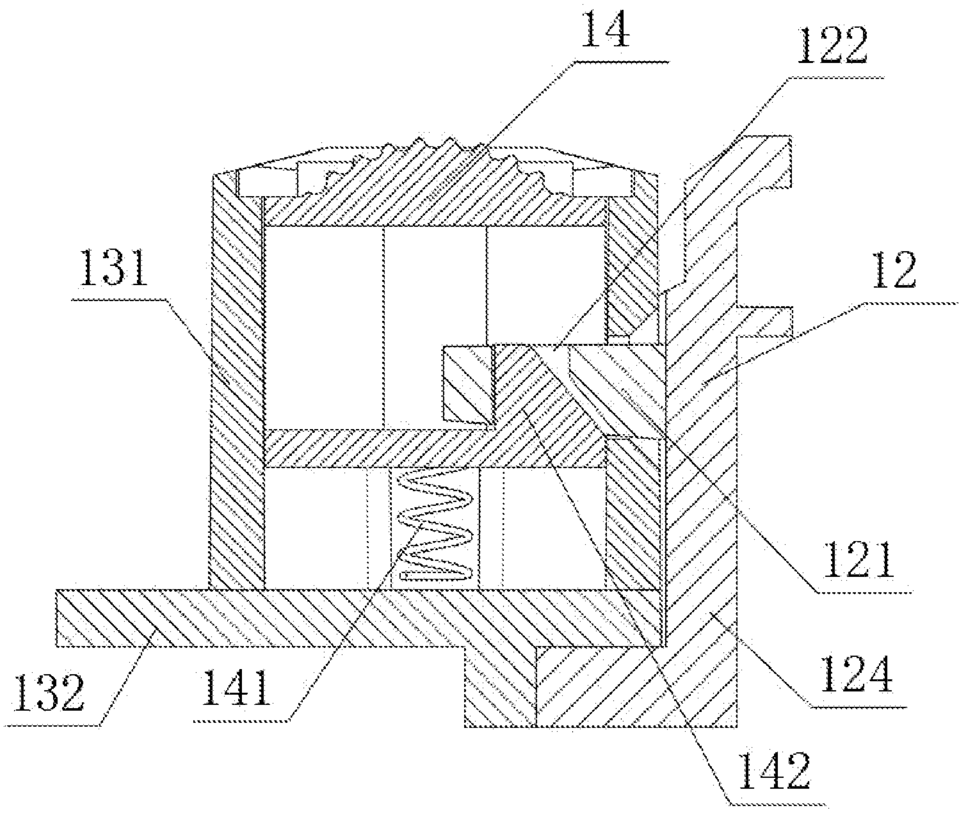
FIG. 2 is a structural schematic diagram illustrating an internal sectional of the toolbox group connecting structure in accordance with some embodiments of the present disclosure.
Figure 3:
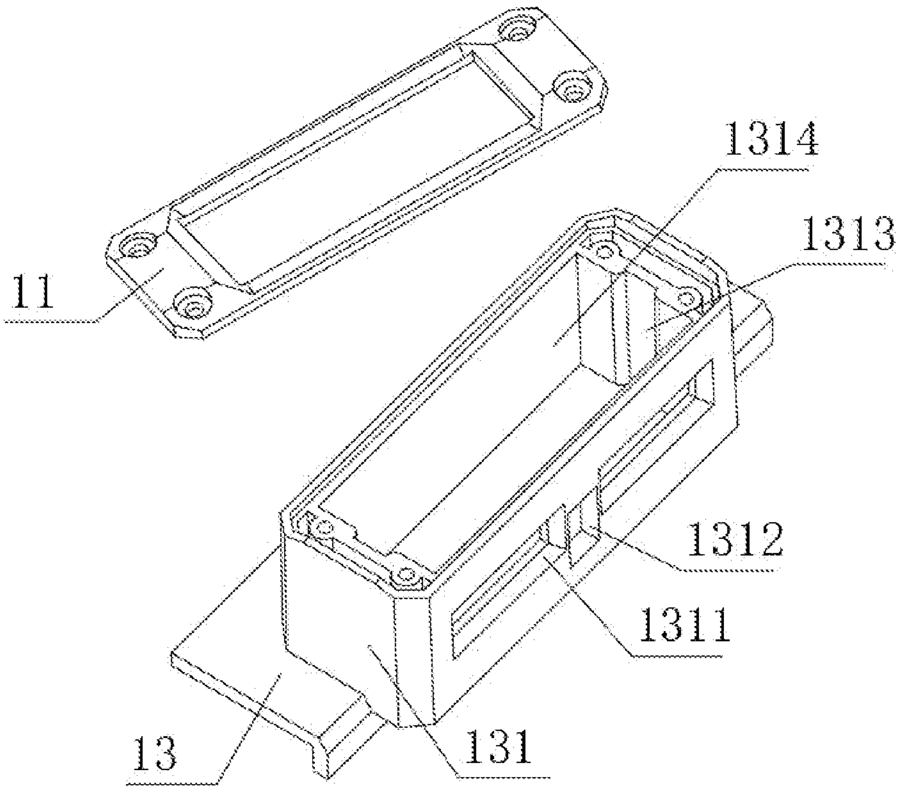
FIG. 3 is a structural schematic diagram illustrating a connecting cover and a connecting box in accordance with some embodiments of the present disclosure.

Referring to FIG. 1, FIG. 2 and FIG. 3, the connecting device 13 includes a connecting plate 132, the connecting plate 132 is fixedly connected with a connecting box 131 at an upper side, the connecting box 131 is configured with an internal cavity 1314 inside, and the internal cavity 1314 is configured with a press switch 14 for sliding connection.

Referring to FIG. 2, FIG. 3, FIG. 5 and FIG. 6, left and right sides of the press switch 14 each is configured with a placing slot 145, the placing slot at a lower end is configured to run through a bottom wall of the press switch 14, the placing slot 145 is closed at an upper end, and the placing slot 145 has a press spring 141 placed therein. An upper end of the press spring 141 rests against the upper end of the placing slot 145, a lower end of the press spring 141 rests against a bottom wall of the internal cavity 1314, and the internal cavity 1314 is configured with a guiding slot 1313 corresponding to a position of the press spring 141. An inner center of a side wall of the press switch 14 that away from the snap-fitting device 12 is fixedly connected to an install post 147, the install post 147 is configured to sleeve with a stop spring 143, and one end of the stop spring 147 that far away from the install post 147 is fixed connected with a stop plate 144. A side wall of the press switch 14 near the snap-fitting device 12 is configured with a penetration opening 146 corresponding to a position of the stop plate 144, and the stop plate 144 slides through the penetration opening 146. The left and right sides of the press switch 14 are further symmetrically configured with a through opening, and the through opening is fixedly connected with a bump 142 at a lower side near an end of the snap-fitting device 12. A side wall of the connecting box 131 near the snap-fitting device 12 that corresponding to the through opening at the left and right sides is configured with snap sockets 1311 for snap blocks 121 to pass through, and a position corresponding to the stop plate 144 is configured with a notch 1312 for the stop plate 144 to pass through.

Figure 5:
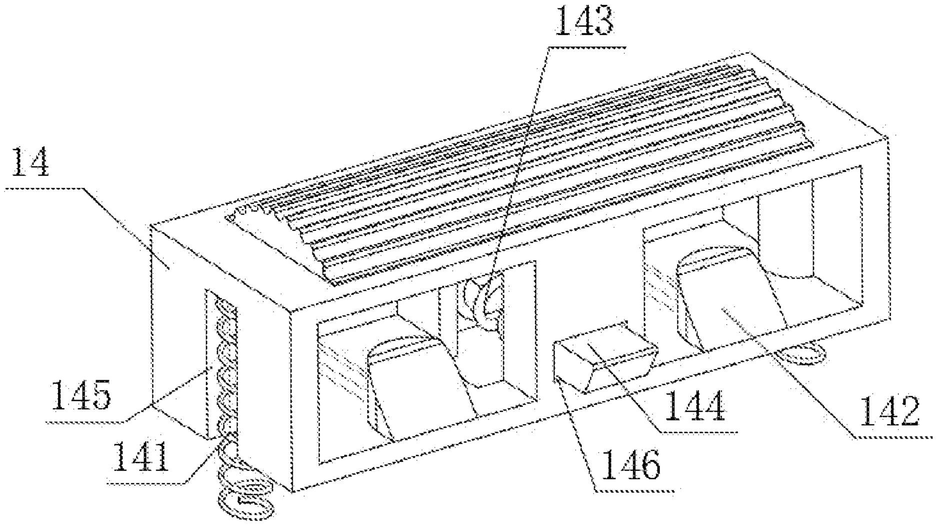
FIG. 5 is a structural schematic diagram illustrating a first view stereoscopic of a press switch in accordance with some embodiments of the present disclosure.

Referring to FIG. 5, an outside of the bump 142 facing the press switch 14 is configured with a connecting bevel.

By providing the connecting bevel, it is possible to break down a horizontal squeezing force of the snap block 121 into a downward force, so that the bump 142 has a downward movement to ensure the docking of the bump 142 and the snap block 121.

Figure 6:
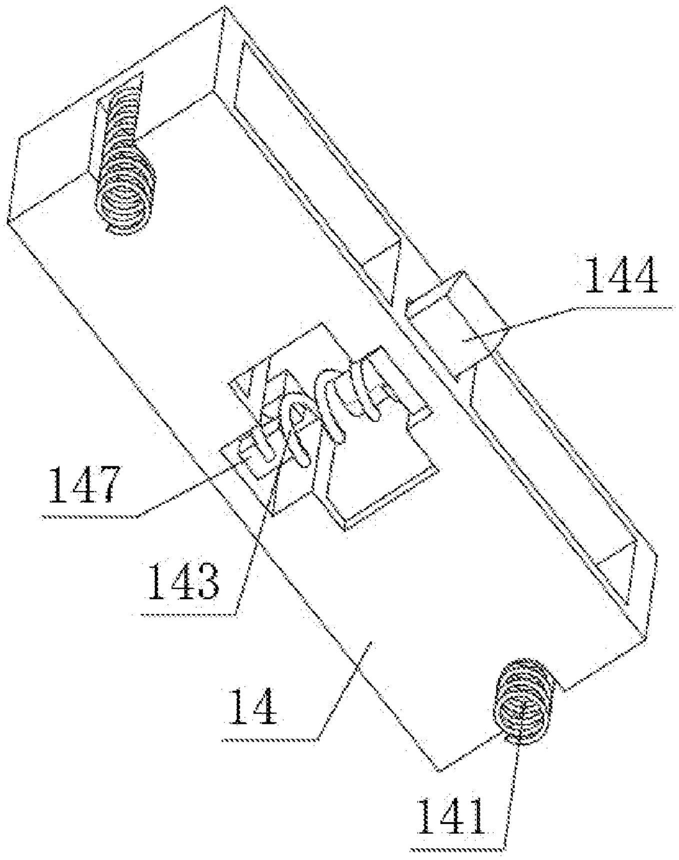
FIG. 6 is a structural schematic diagram illustrating a second view stereoscopic of a press switch in accordance with some embodiments of the present disclosure.
Figure 7:
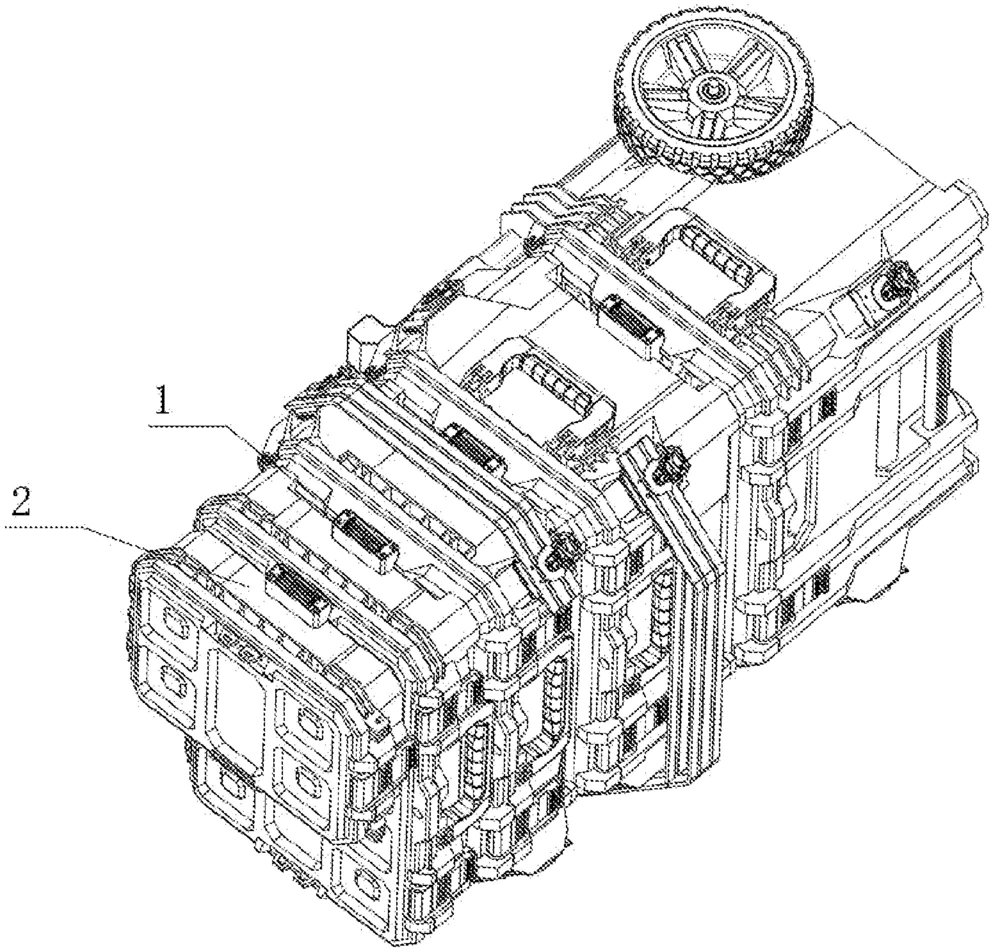
FIG. 7 is a stereogram of a trolley tool cart constituted by several toolboxes in accordance with some embodiments of the present disclosure.

Referring to FIG. 6, the stop plate 144 is also fixedly connected to a limiting bump at one end near the install post 147.

By providing the limiting bump, it is possible to avoid the stop plate 144 from fully popup the penetration opening 146.

Referring to FIG. 1, FIG. 2, FIG. 3 and FIG. 5, the internal cavity 1314 is configured with a stepped opening at an upper end, a connecting cover 11 is movably embedded into the stepped opening, four corners of the connecting cover 11 are fixedly embedded in the connecting box 131 by means of a number of connecting bolts, an exploratory outlet is provided in a center of the connecting cover 11, and a boss is provided at the upper end of the press switch 14 and the boss extends upwardly through the exploratory outlet.

Figure 4:
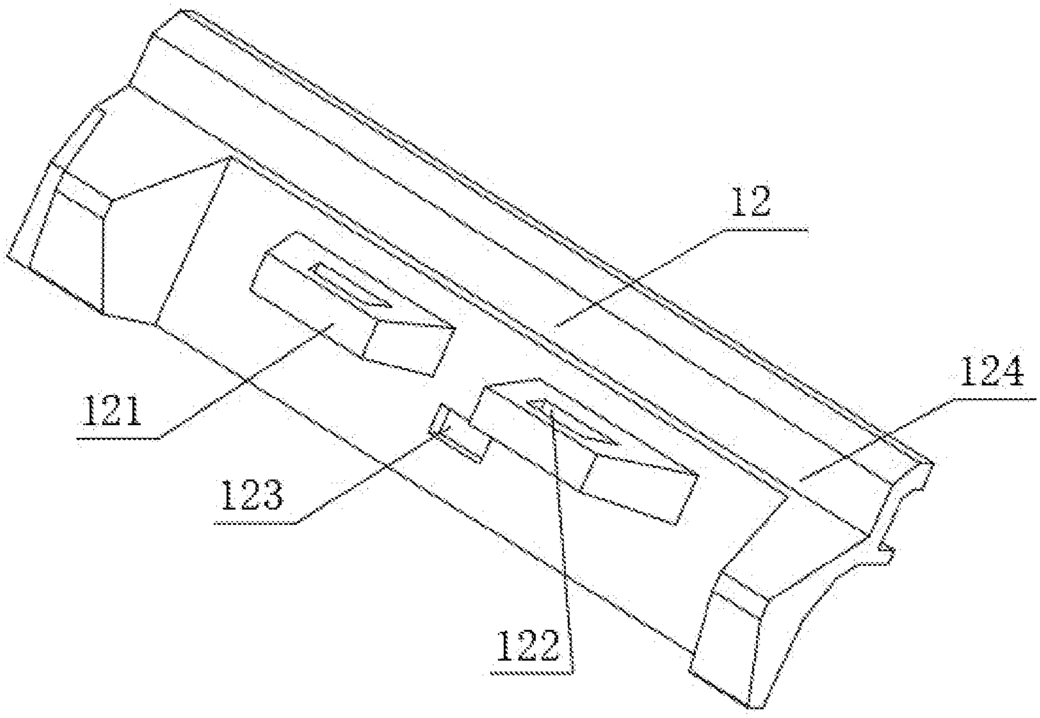
FIG. 4 is a structural schematic diagram illustrating a snap-fitting device in accordance with some embodiments of the present disclosure.

Referring to FIG. 4 and FIG. 5, the snap-fitting device 12 includes a snap plate 124, the snap plate 124 is configured with a docking bayonet corresponding to a position of the connecting box 131, the docking bayonet inside corresponding to positions of two through openings of the connecting box 131 are fixedly connected to the snap blocks 121, a center of each snap block 121 is opened with a snap interface 122 for mating and snapped with the bump 142, and a backstop slot 123 is provided between two snap blocks 121 corresponding to a position of the stop plate 144 for the stop plate 144 to be pushed in.

Operations of taking the toolbox are as follows. The press switch 14 is pressed to compresses the press spring 141 and at the same time drives its internal stop spring 143, the stop plate 144 and the bump 142 down. When it is moved down to a certain distance, the bump 142 is separated from the snap interface 122 (at this moment two toolboxes have been separated). When moved down to a certain distance again, the stop plate 144 is pushed into the backstop slot 123 by the action of the stop spring 143 (at this moment the stop plate 144 locks the press switch 14, so that the press switch 14 cannot be rebounded by the action of the press spring 141). At this time, the two toolboxes 2 can be separated (at this moment the switch is locked and the press switch 14 is held up by the stop plate 144, it is always open, so that a user can operate with both hands to carry out the box operation and ensure safety).

Operations of stacking the toolboxes are as follows. When stacking the toolboxes, the snap block 121 is inserted through the snap socket 1311 on the connecting box 131. And when inserting, an upper surface of the snap block 121 is pressed against a lower bevel of the bump 142, so that the bump 142 is subjected to a downward decomposition force, and the bump 142 drives the press switch 14 to press down. Then a downward pressure of the press switch 14 drives the stop spring 143 to retract the stop plate 144, and after the bump 142 and the snap interface 122 of the snap block 121 are aligned, the press spring 141 jacks up the press switch 14 so that the bump 142 snaps into the snap block 121, and finally two adjacent toolboxes are tightly connected.

The above are only some preferred embodiments of the present disclosure, and are not intended to limit the present invention, which may be subject to various changes and variations for an ordinary person of skill in the art. Any modifications, equivalent substitutions, improvements, etc. made within the spirit and principles of the present disclosure shall be included in the scope of protection of the present invention.

What is claimed is:

1. A toolbox group connecting structure, comprising a connecting device (13) and a snap-fitting device (12), wherein the connecting device (13) and the snap-fitting device (12) are respectively installed on two adjacent toolboxes (2), the two adjacent toolboxes (2) are inserted to mate through the connecting device (13) and the snap-fitting device (12), and a plurality of toolboxes (2) together form a trolley tool cart;

wherein the connecting device (13) comprises a connecting plate (132), the connecting plate (132) is fixedly connected with a connecting box (131) at an upper side, the connecting box (131) is configured with an internal cavity (1314) inside, and the internal cavity (1314) is configured with a press switch (14) for sliding connection;

wherein left and right sides of the press switch (14) each is configured with a placing slot (145), the placing slot (145) at a lower end is configured to run through a bottom wall of the press switch (14), placing slot (145) is closed at an upper end, and the placing slot (145) has a press spring (141) placed therein;

wherein an upper end of the press spring (141) rests against the upper end of the placing slot (145), a lower end of the press spring (141) rests against a bottom wall of the internal cavity (1314), and the internal cavity (1314) is configured with a guiding slot (1313) corresponding to a position of the press spring (141);

wherein an inner center of a side wall of the press switch (14) that away from the snap-fitting device (12) is fixedly connected to an install post (147), the install post (147) is configured to sleeve with a stop spring (143), and one end of the stop spring (143) that far away from the install post (147) is fixed connected with a stop plate (144);

wherein a side wall of the press switch (14) near the snap-fitting device (12) is configured with a penetration opening (146) corresponding to a position of the stop plate (144), and the stop plate (144) slides through the penetration opening (146);

wherein the left and right sides of the press switch (14) are further symmetrically configured with a through opening, and the through opening is fixedly connected with a bump (142) at a lower side near an end of the snap-fitting device (12); and wherein a side wall of the connecting box (131) near the snap-fitting device (12) that corresponding to the through opening at the left and right sides is configured with snap sockets (1311) for snap blocks (12) to pass through, and a position corresponding to the stop plate (144) is configured with a notch (1312) for the stop plate (144) to pass through.

2. The toolbox group connecting structure according to claim 1, wherein an outside of the bump (142) facing the press switch (14) is configured with a connecting bevel.

3. The toolbox group connecting structure according to claim 1, wherein the stop plate (144) is also fixedly connected to a limiting bump at one end near the install post (147).

4. The toolbox group connecting structure according to claim 1, wherein the internal cavity (1314) is configured with a stepped opening at an upper end, a connecting cover (11) is movably embedded into the stepped opening, four corners of the connecting cover (11) are fixedly embedded in the connecting box (131) by means of a number of connecting bolts, an exploratory outlet is provided in a center of the connecting cover (11), and a boss is provided at the upper end of the press switch (14) and the boss extends upwardly through the exploratory outlet.

5. The toolbox group connecting structure according to claim 1, wherein the snap-fitting device (12) comprises a snap plate (124), the snap plate (124) is configured with a docking bayonet corresponding to a position of the connecting box (131), the docking bayonet inside corresponding to positions of two through openings of the connecting box (131) is fixedly connected to the snap blocks (121), a center of each snap block (121) is opened with a snap interface (122) for mating and snapped with the bump (142), and a backstop slot (123) is provided between two snap blocks (121) corresponding to a position of the stop plate (144) for the stop plate (144) to be pushed in.

* * * * *